(12) United States Patent
Sadovsky et al.

(10) Patent No.: US 7,532,234 B2
(45) Date of Patent: May 12, 2009

(54) AUTOMATIC ANALYSIS AND ADJUSTMENT OF DIGITAL IMAGES UPON ACQUISITION

(75) Inventors: Vladimir Sadovsky, Bellevue, WA (US); Po Yuan, Renton, WA (US); Andrew Shaun Ivory, Woodinville, WA (US); Richard S. Turner, Jr., Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 10/600,199

(22) Filed: Jun. 19, 2003

(65) Prior Publication Data

US 2004/0258308 A1 Dec. 23, 2004

(51) Int. Cl.
*H04N 5/225* (2006.01)
(52) U.S. Cl. .................................. 348/207.1
(58) Field of Classification Search ............ 348/333.01, 348/333.02, 333.03, 333.04, 333.05, 333.06, 348/333.07, 333.08, 333.09, 333.1, 333.11, 348/333.12, 333.13, 207.1, 207.11; 715/705, 715/707, 708, 709, 763
See application file for complete search history.

(56) References Cited

U.S. PATENT DOCUMENTS

| | | | |
|---|---|---|---|
| 5,539,368 | A | 7/1996 | Yamashita |
| 5,818,975 | A | 10/1998 | Goodwin et al. |
| 6,195,467 | B1 | 2/2001 | Asimopoulos et al. |
| 6,301,440 | B1 * | 10/2001 | Bolle et al. ............. 396/128 |
| 6,603,886 | B1 | 8/2003 | Matama |
| 6,608,650 | B1 * | 8/2003 | Torres et al. ............. 348/333.02 |
| 6,930,718 | B2 * | 8/2005 | Parulski et al. ......... 348/333.11 |
| 7,038,724 | B2 * | 5/2006 | Satoh et al. ............. 348/333.05 |
| 7,197,158 | B2 * | 3/2007 | Camara et al. .............. 382/100 |
| 7,242,800 | B2 * | 7/2007 | Iguchi et al. ................ 382/167 |
| 7,359,572 | B2 * | 4/2008 | Liu et al. ...................... 382/274 |
| 2002/0061142 | A1 | 5/2002 | Hiramatsu |
| 2004/0252217 | A1 * | 12/2004 | Battles et al. ........... 348/333.01 |
| 2005/0200921 | A1 * | 9/2005 | Yuan et al. .................. 358/518 |
| 2005/0201634 | A1 * | 9/2005 | Yuan et al. .................. 382/274 |

OTHER PUBLICATIONS

Adobe Systems, Inc., "Adobe Photoshop Album: Product Overview," 2 pp. (downloaded from the World Wide Web on Feb. 27, 2003).
Apple Computer, Inc., "iPhoto2: Picture Your Digital Lifestyle," 3 pp. (downloaded from the World Wide Web on Feb. 27, 2003).

(Continued)

*Primary Examiner*—Justin P Misleh
(74) *Attorney, Agent, or Firm*—Klarquist Sparkman, LLP (57) ABSTRACT

In one aspect, an application analyzes and adjusts image data (e.g., pixel data) automatically upon acquiring (e.g., from a source such as a digital camera) a digital image. Adjustments can be based on, for example, image orientation, red-eye detection, blurriness, color balance, exposure, or noise detection. Metadata corresponding to image adjustments can be stored in an adjusted image file to preserve the original image. In another aspect, a computer system includes image analysis and image adjustment software modules for analyzing and adjusting digital image data at image acquisition time. The image adjustment module can include one or more processing filters. A customizable software architecture allows customization of the image adjustment software module (e.g., by adding, removing or reordering processing filters). The described techniques and tools can be implemented as features of an operating system environment.

45 Claims, 7 Drawing Sheets

OTHER PUBLICATIONS

Apple Computer, Inc., "Fine Tune Your Photos," 2 pp. (downloaded from the World Wide Web on Feb. 27, 2003).

Ashikhmin, "A Tone Mapping Algorithm for High Contrast Images," *Eurographics Workshop on Rendering*, pp. 1-11 (Jun. 2002).

Fattal et al., "Gradient Domain High Dynamic Range Compression", *ACM SIGGRAPH* 2002, 8 pp. (2002).

"Filtering and Enhancing Images", *Computer Vision*, pp. 145-150 (Mar. 2000).

Fridrich, "Robust Bit Extraction from Images," IEEE International Conference on Multimedia Computing and Systems, 5 pp. (1999).

Jack, *Video Demystified*, Ch. 3 ("Color Spaces"), pp. 15-34, 3d ed. (2001).

Mann, "Comparametric Equations with Practical Applications in Quantigraphic Image Processing", *IEEE Transactions on Image Processing*, vol. 9, No. 8, pp. 1389-1405 (Aug. 2000).

Novak et al., "Estimating Scene Properties from Color Histograms," DARPA Image Understanding Workshop, 33 pp., Washington D.C. (1993).

Robertson et al., "Dynamic Range Improvement Through Multiple Exposures," *Int'l Conf. on Image Processing*, Kobe, Japan, 5 pp. (Oct. 1999).

Scheel et al., "Tone Reproduction for Interactive Walkthroughs," *EuroGraphics* 2000, vol. 19, No. 3, 12 pp. (Aug. 2000).

Siebert, "Differential Invariants under Gamma Correction," *Vision Interface*, 8 pp. Montreal (2000).

Tsin et al., "Statistical Calibration of CCD Imaging Process," *Proc. IEEE* 2001 *Int'l Conf. on Computer Vision*, 8 pp. (2001).

Dardier et al., "Enhancement of Improperly Exposed Photographic Color Negatives", *IS&T/SPIE's 2nd Annual Symposium on Electronic Imaging: Science & Technology*, 13 pp. (Jan. 1999).

Dardier et al., "Automatic Out of Range Photo Recognition Using Digital Techniques," *International Symposium on Electronic Image Capture and Publishing*, 11 pp. (draft document dated Apr. 1998).

Jaimes et al., "Improving Quality of Digital Images of Art in Museum Collections," *IS&T Image Processing, Image Quality, Image Capture, Systems Conference (PICS)*, Montreal, Canada, 5 pp. (Apr. 2001).

Jobson et al., "Retinex Image Processing: Improved Fidelity to Direct Visual Observation," *Proc. 4th Color Imaging Conf.: Color Science, Systems & Applications*, 4 pp. (Nov. 1996).

Microsoft Corp., "Microsoft® Windows® Platform Development: Still Image Connectivity for Windows," 7 pp. (downloaded from the World Wide Web on Apr. 2, 2003; document dated Dec. 2001).

Microsoft Corp., "Microsoft® Windows® Platform Development: Digital Still Camera Support," 2 pp. (downloaded from the World Wide Web on Apr. 2, 2003; document dated Dec. 2001).

Microsoft Corp., "Microsoft Knowledge Base Article 266348: Description of Windows Image Acquisition," 1 p. (downloaded from the World Wide Web on Apr. 2, 2003; document dated Jul. 2002).

Microsoft Corp., "Microsoft® Windows® Platform Development: WIA Architecture," 6 pp. (downloaded from the World Wide Web on Apr. 2, 2003; document dated Dec. 2001).

Microsoft Corp., "WDM Still Image Architecture," 10 pp. (downloaded from the World Wide Web on Apr. 3, 2003; document dated Dec. 1998).

Microsoft Corp., "Windows Platform Design Notes: Supporting MetaData in Image Files Through GDI+," 13 pp. (Apr. 2000).

Microsoft Corp., "Microsoft® Windows® Platform Development: MetaData in Image Files and GDI+," 2 pp. (downloaded from the World Wide Web on Apr. 2, 2003; document dated Dec. 2001).

Microsoft Corp., "IWiaData Transfer Interface," 2 pp. (downloaded from the World Wide Web on Apr. 3, 2003).

Microsoft Corp., "WIA Architecture," 1 p. (downloaded from the World Wide Web on Apr. 3, 2003).

Microsoft Corp., "Still Image: Data Acquisition Models," 2 pp. (downloaded from the World Wide Web on Apr. 3, 2003).

Microsoft Corp., "About Windows Image Acquisition," 1 p. (downloaded from the World Wide Web on Apr. 3, 2003).

Microsoft Corp., "Device Object," 2 pp. (downloaded from the World Wide Web on Apr. 3, 2003).

Microsoft Corp., "Objects," 1 p. (downloaded from the World Wide Web on Apr. 3, 2003).

Microsoft Corp., "How to Use Filters," 2 pp. (downloaded from the World Wide Web on Apr. 3, 2003).

Microsoft Corp., "About Microsoft Windows Image Acquisition Automation Layer," 3 pp. (downloaded from the World Wide Web on Apr. 3, 2003).

Microsoft Corp., "Windows Image Acquisition Automation Layer," 1 p. (downloaded from the World Wide Web on Apr. 3, 2003).

Niehues-Brooks et al., "Automated Digital Image Analysis of Video Ice Crystal Data," *Proc. ISCA 14th Int'l Conf. on Computers and Their Applications*, 4 pp. (1999).

Nijmeijer et al., "Correction of Lens-Distortion for Real-Time Image Processing Systems," *Proc. 1993 IEEE Workshop on VLSI Signal Processing*, vol. 6, pp. 316-324 (Oct. 1993).

Ojanen, "Automatic Correction of Lens Distortion by Using Digital Image Processing," (document dated Jul. 1999).

Szummer et al., "Indoor-Outdoor Image Classification", *IEEE Int'l Workshop on Content-Based Access of Image and Video Databases*, 10 pp. (Jan. 1998).

Technical Standardization Committee on AV & IT Storage Systems and Equipment, "Exchangeable Image File Format for Digital Still Cameras: Exif Version 2.2," 146 pp., Japan Electronics and Information Technology Industries Association (Apr. 2002).

* cited by examiner

Figure 1

Software 180 implementing tools for automatic analysis and adjustment of digital images

AUTOMATIC ANALYSIS AND ADJUSTMENT OF DIGITAL IMAGES UPON ACQUISITION

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to processing of digital images, and more particularly relates to automatically analyzing and adjusting digital images when the images are acquired.

BACKGROUND

Digital images (e.g., images captured by digital cameras or scanners) are generally not perfect photographs. Problems with digital images can include, for example, underexposure, red-eye caused by flash, incorrect orientation and blurriness.

Consumers demand high visual quality and convenience in dealing with digital photographs. Previously, users have relied on third-party imaging software to re-touch digital images. These software packages provide complicated adjustable scalars for users to adjust images manually after the images have been acquired by a PC. While some software packages provide adjustment functions requiring less user expertise or interaction, they normally require the end-user to initiate the adjustment for individual images.

Whatever the benefits of previous techniques, they do not have the advantages of the techniques and tools presented below.

SUMMARY

In summary, the detailed description is directed to various techniques and tools for automatically analyzing and adjusting digital images upon acquisition of the images. Digital images processed using the described techniques and tools can be compressed or uncompressed color or greyscale images in a variety of formats (e.g., JPEG, EXIF, BMP, TIFF, PNB, GIF, WMF, or EMF formats).

In one aspect, an application processes a digital image by analyzing image data from a digital image file; and adjusting the image data (e.g., pixel data) from the digital image file based at least in part on the analysis of the image data. The analyzing and the adjusting are performed automatically upon acquiring the digital image file. The automatic analyzing and adjusting can be turned on or off (e.g., by a user). The image data is acquired from a digital image data source such as a digital camera, scanner, digital video camera or mass-storage device. Acquisition can be initiated at a source location or target location for the digital image, and can be performed via a wired or wireless communication medium locally or over a network. Non-image information (e.g., flash information, focal length, shutter speed, camera model information, aperture setting, or date/time information) also can be analyzed. The adjusting can be based on image characteristic data (e.g., image orientation data, red-eye detection data, blur data, color balance data, exposure data, or noise data). Metadata corresponding to image adjustments can be generated and stored in a digital image file containing an adjusted image. Storing the metadata in the file facilitates preservation of an original version of the image. An image file with adjustment metadata can be provided to a user-mode application that requested the acquisition of the image.

In another aspect, a computer system comprises an image analysis software module for analyzing digital image data at image acquisition time; and an image adjustment software module for adjusting digital image data at image acquisition time based at least in part on the analysis. Features of the system (e.g., the analysis and adjustment modules) can be included in an image acquisition service of an operating system. The system can include an image decoder for decoding compressed digital image data and an image encoder for encoding adjusted digital image data. The image adjustment software module can include one or more processing filters for adjusting the digital image data. The system also can comprise an extensible software architecture operable to allow customization of the image adjustment software module. The architecture can include processing filters encapsulating image adjustment functions. Customizing can include adding, removing or reordering processing filters. The image adjustment software module can be capable of generating metadata corresponding to adjustments of the digital image data, and the system can include a metadata/image integrator for integrating metadata into a file containing an adjusted image.

In another aspect, software for a digital image analysis and adjustment system is developed by receiving a software platform for analyzing and adjusting digital images upon acquisition of the digital images, where the software platform includes a customizable software architecture for adjusting digital image data based on analysis of the digital image data, and creating a custom image adjustment module compatible with the customizable software architecture. The custom image adjustment module adds image adjustment functionality to the system.

In another aspect, a software system providing digital image processing functionality includes a customizable software architecture for adjusting digital image data based on analysis of the digital image data upon acquisition of digital images from a digital image source, wherein the customizable software architecture is capable of operably coupling one or more image adjustment modules encapsulating image adjustment functions to one or more image analysis modules. The functionality of the software system is capable of being customized by altering an arrangement of image adjustment modules operably coupled to the one or more image analysis modules. Altering the arrangement can include adding, removing or changing the functional order of image adjustment modules encapsulating image adjustment functions.

The described techniques and tools can be implemented as features of an operating system environment. In some embodiments, the described techniques and tools are implemented in a managed code environment or in a background service of an operating system environment.

The various techniques and tools can be used in combination or independently. Different embodiments implement one or more of the described techniques and tools.

Additional features and advantages will be made apparent from the following detailed description of different embodiments that proceeds with reference to the accompanying drawings.

DETAILED DESCRIPTION

Techniques and tools for automatic analysis and adjustment of digital images are described. The techniques and tools facilitate digital image analysis and adjustment functions triggered by image acquisition. The digital images can be color, grey-scale, or other types of images in a variety of formats (e.g., JPEG, EXIF, BMP, TIFF, PNB, GIF, WMF and/or EMF formats). The digital images can be acquired from any device capable of capturing or storing digital still images (e.g., digital cameras, scanners, digital camcorders, webcams, mass storage devices, etc.).

For example, using one or more of the described techniques and tools, an application automatically adjusts digital photographs transferred to a target location (e.g., a PC) from a source location (e.g., a digital camera). The described techniques and tools save users from the burden of manually adjusting digital images after they are acquired to the PC.

Features of some embodiments of the described techniques and tools include: (1) image adjustment without user interaction based on image analysis results; (2) batch processing of images; and (3) custom configuration and updating of image analysis and adjustment processing. Automatic image analysis and adjustment can be turned on and off (e.g., by a user via interaction with a graphical user interface).

Some embodiments facilitate preservation of original versions of digital images by generating metadata corresponding to adjustments of the digital image data. The metadata describes the adjustments and allows the adjustments to be reversed or "undone."

Some embodiments include an extensible architecture. The extensible architecture allows independent hardware vendors (IHVs) and independent software vendors (ISVs) to advocate their technologies by providing their own "plug-ins" to perform image analysis and/or adjustment. For example, filters for performing image adjustments can be added, removed, or reordered to change how images are adjusted in response to image analysis.

Some embodiments are included in a subsystem (e.g., an image acquisition service) within an operating system. An image acquisition service processes requests (e.g., from user-mode applications via an application programming interface) to acquire image files, and communicates with devices at a source location (e.g., via drivers such as user mode drivers or kernel mode drivers) to transfer the image files.

Some embodiments operate in a managed code environment, with automatic image analysis and adjustment tools and techniques being outside an image acquisition service. Automatic image analysis and adjustment tools and techniques also can be implemented in a background service in an operating system.

I. Computing Environment

Figure 1:
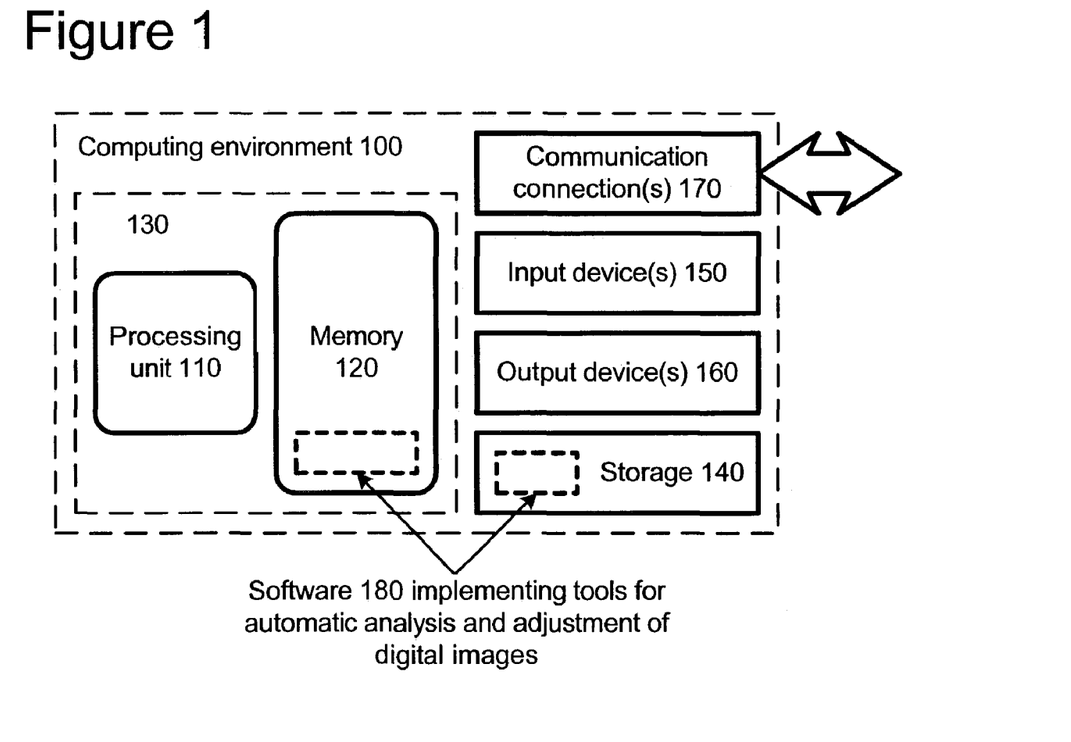
FIG. 1 is a block diagram of a suitable computing environment for implementing tools for automatic analysis and adjustment of digital images.

FIG. 1 illustrates a generalized example of a suitable computing environment 100 in which the described techniques and tools may be implemented. The computing environment 100 is not intended to suggest any limitation as to scope of use or functionality of the invention, as the present invention may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing tools for automatic analysis and adjustment of digital images.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. In some embodiments, operating system software includes tools for automatic analysis and adjustment of digital images. The computing environment desirably includes digital image processing hardware (e.g., a scanning device and/or digital camera) and software.

The storage 140 may be removable or non-removable, and includes magnetic disks, magnetic tapes or cassettes, CD-ROMs, CD-RWs, DVDs, or any other medium which can be used to store information and which can be accessed within the computing environment 100. The storage 140 stores instructions for the software 180 implementing tools for automatic analysis and adjustment of digital images.

The input device(s) 150 may be a touch input device such as a keyboard, mouse, pen, or trackball, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, digital image information, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "analyze," "determine," "adjust," and "acquire" to describe computer operations in a computing environment. These terms are high-level abstractions for operations performed by a computer, and should not be confused with acts performed by a human being. The actual computer operations corresponding to these terms vary depending on implementation.

II. Acquisition of Digital Images

Image acquisition refers to activities associated with transferring one or more digital images from a source location to a target location. A source location is a device that 1) is capable of storing or capturing one or more digital images, and 2) allows one or more digital images to be transferred to a target location. A target location is a device that 1) is capable of storing one or more digital images, and 2) is capable of receiving digital images from a source location. For example, a PC can acquire images from a source location (e.g., a digital camera, scanner, or other device) connected to the PC via a wired connection (e.g., via a serial port or USB connection) or a wireless connection.

Figure 2:
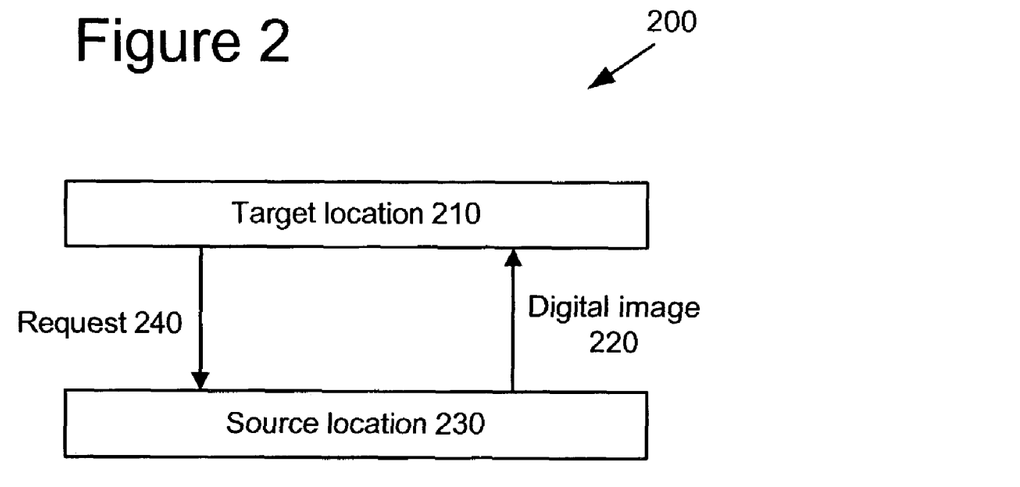
FIG. 2 is a block diagram illustrating a pull model of image acquisition.

Referring to FIG. 2, in a "pull" model 200 of image acquisition, a target location 210 initiates (e.g., by user interaction with an application at the target location) image acquisition of a digital image 220 from a source location 230. Target location 210 sends a request 240 to the source location 230 and receives the digital image 220 from the source location in response to the request. For example, an application at target location 210 (e.g., a desktop PC, handheld computer, or other target location) locates and selects a digital image to acquire. In one common scenario, a PC user instructs a PC to acquire a digital image from a digital camera connected to the PC by interacting with the PC via a graphical user interface ("GUI") for an application on the PC. For example, a PC user can interact with a GUI for a device "wizard," an imaging application (e.g., Microsoft® Picture It! or Photoshop by Adobe Systems Inc.) or an image acquisition service in an operating system.

Figure 3:
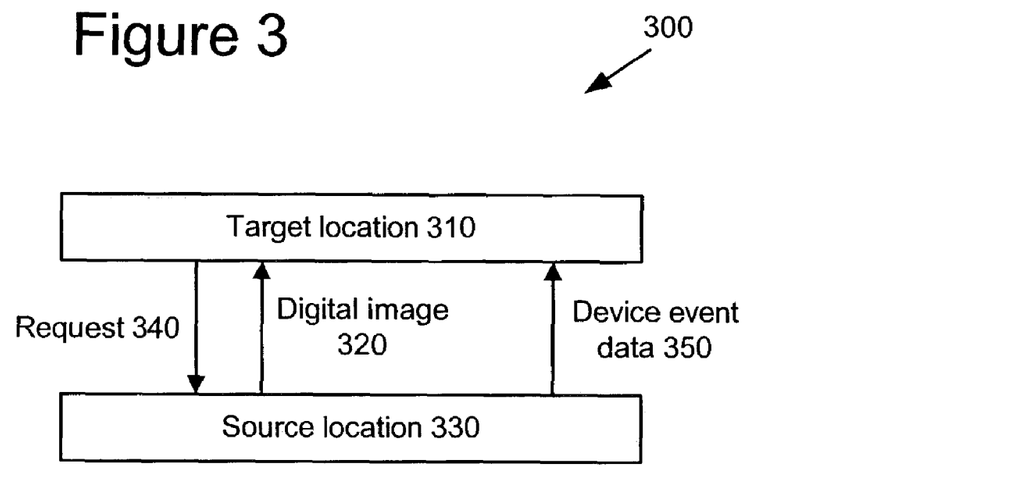
FIG. 3 is a block diagram illustrating a push model of image acquisition.

Referring to FIG. 3, in a "push" model 300 of image acquisition, a source location 330 (e.g., a digital camera) initiates image acquisition by sending device event data 350 to target location 310 (e.g., a PC). In response, target location 310 requests acquisition of a digital image 320 by sending a request 340 to the source location 330. For example, in one common scenario, a connection of a scanner to a PC produces a device event, and in response, an application launches on the PC and requests retrieval of a scanned image from the connected scanner. A source location can also send a message (e.g., a notification that a digital image is now available for retrieval) to an application that is already running at the target location. In response, the application requests retrieval of the image. For example, a scanner connected to a PC notifies a digital image editor running on the PC that a scanned image is available for retrieval. A user can also cause the digital image source to initiate the transfer (e.g., by pushing a button on a digital camera, scanner, or video camera)

III. Automatic Image Analysis and Adjustment

Described embodiments include techniques and tools facilitating automatic analysis and adjustment of digital images initiated by image acquisition.

The features of these techniques and tools include:
1. Automatic adjustment of digital images based on image analysis results; no user interaction is needed, although a user can have the option of turning the automatic analysis and adjustment on or off.
2. Automatic adjustment of digital images based on image analysis results in batch mode, when acquisition is done in batch mode.
3. An extensible architecture allowing image analysis and adjustment tools and techniques to be custom-configured and updated.

Figure 4:
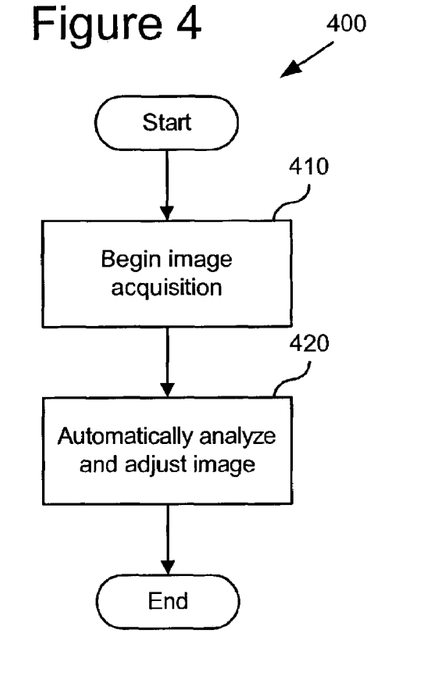
FIG. 4 is a flow diagram showing an acquisition-triggered automatic analysis and adjustment technique for digital images.

FIG. 4 shows a technique 400 for automatically analyzing and adjusting digital images. First, at 410, image acquisition begins. Image acquisition may be according to a push model or a pull model of image acquisition, examples of which are described above. Image acquisition initiates automatic analysis and adjustment of the image at 420.

Figure 5:
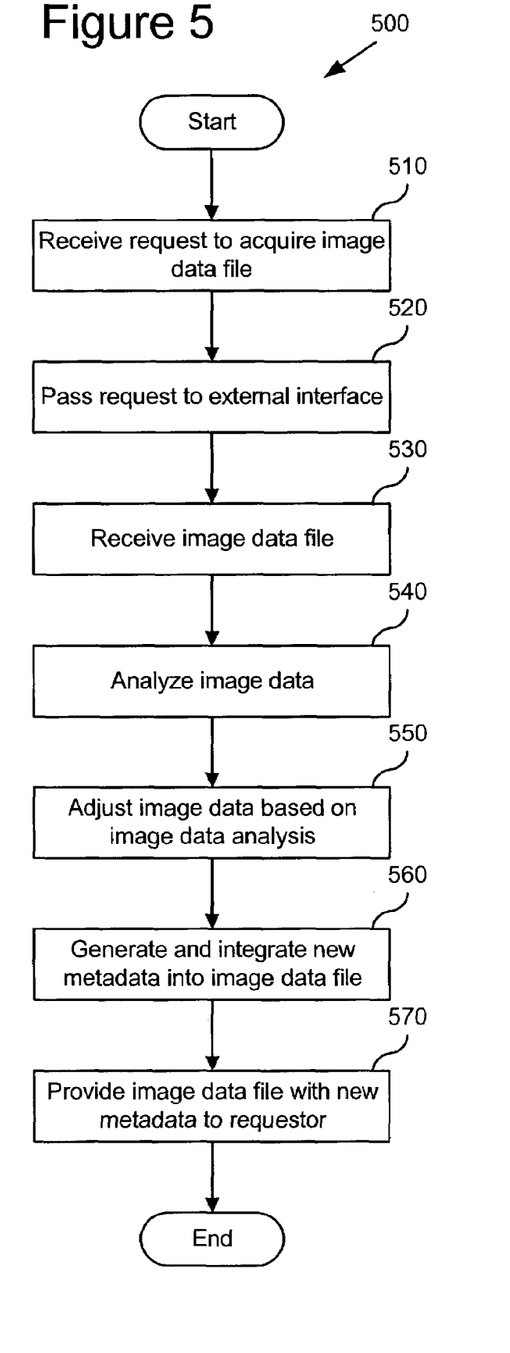
FIG. 5 is a flow diagram showing an acquisition-triggered automatic analysis and adjustment technique for digital images.

In some embodiments, the process of automatically analyzing and adjusting digital images includes three main stages: analyzing the image; processing the image data to render new image data based on the image analysis results; and generating and integrating new metadata into the image data file. FIG. 5 shows a technique 500 that includes these three main stages (represented in FIG. 5 at blocks 540, 550 and 560).

First, when image acquisition is initiated, the automatic analysis and adjustment service receives a request to acquire an image data file at 510. At 520, the automatic image analysis and adjustment service passes this request to an external interface. For example, referring to FIG. 6, automatic image analysis and adjustment tools 610 use one or more interfaces to pass the request to image capture device 680 via hardware interface 670.

Referring again to FIG. 5, at 530 the automatic image analysis and adjustment service receives an image data file (e.g., from an image capture device). The automatic image analysis and adjustment service analyzes the image data at 540 and adjusts the image data based on the analysis at 550. The automatic image analysis and adjustment service generates metadata corresponding to the image data adjustment and integrates the new metadata into the image data file at 560. The automatic image analysis and adjustment service provides (570) the image data file with the new metadata to the entity (e.g., user mode process 630 (FIG. 6)) that requested the acquisition of the image data file.

Figure 6:
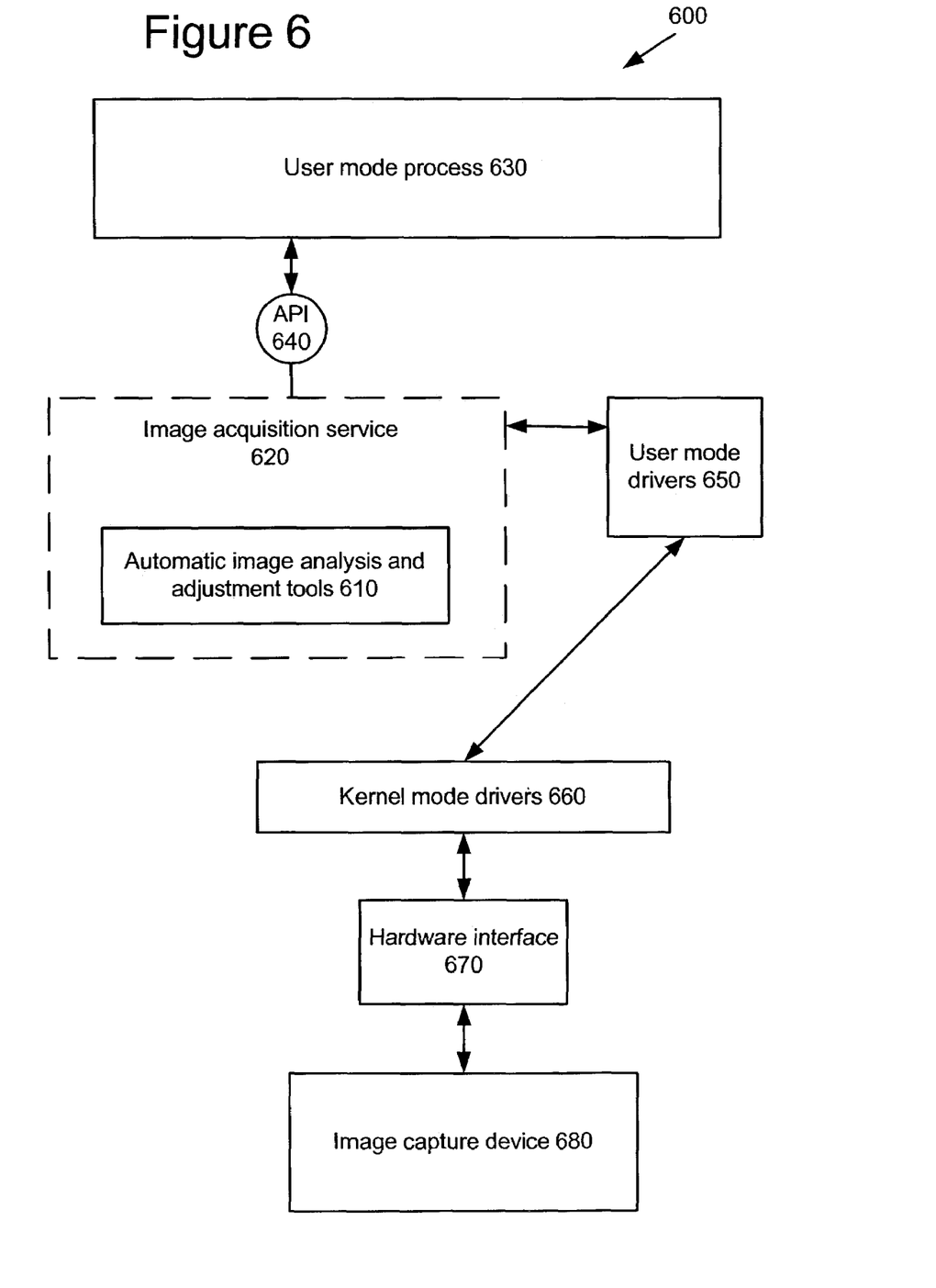
FIG. 6 is a block diagram of a computer system including automatic image analysis and adjustment tools implemented in an image acquisition service.

FIG. 6 shows a block diagram of an exemplary computer system 600 including an automatic image analysis and adjustment service 610. In arrangements such as the one shown in FIG. 6, an automatic image analysis and adjustment service works within an image acquisition service 620. A user mode process 630 at a target location interacts with the image acquisition service and automatic image analysis and adjustment tools 610 via one or more interfaces (e.g., application programming interfaces (APIs) 640) to acquire an image. Image acquisition service 620 allows user mode process 630 to acquire digital images from source locations such as image capture device 680 by facilitating communication with user mode drivers 650, kernel mode drivers 660, and hardware interface 670.

An image acquisition service is a subsystem within an operating system that processes requests from user-mode applications and communicates with device drivers (e.g., camera or scanner drivers) to acquire image files. For example, in some embodiments, the automatic image analysis and adjustment tools are included in a Microsoft® Windows® Image Acquisition (WIA) architecture. In such embodiments, the automatic image analysis and adjustment service tools can leverage features of WIA (e.g., GUIs, broad device coverage) while saving the user from the burden of adjusting digital images after they are acquired to the PC.

WIA includes an API called IWiaDataTransfer. Programming interfaces such as IWiaDataTransfer can be used in conjunction with an automatic image analysis and adjustment service. The API can be modified to include flags signaling whether and in what manner automatic image analysis and adjustment is performed. IWiaDataTransfer includes the member function IWiaDataTransfer::idtGetData, which is called to retrieve files from an appropriate device. For example, in some cases, images are retrieved from a device of a particular class (e.g., "Image Acquisition Device"). The device class can be detected based on a plug-and-play globally-unique identifier ("GUID") stored in an INF file that indicates to WIA that the device is an image capture device, a USB mass-storage device, etc. A software component called "Autoplay" can be used to detect whether retrievable pictures are stored on the device.

In addition to using image acquisition service programming interfaces or modified image acquisition service programming interfaces, the automatic image analysis and adjustment service can use custom programming interfaces created specifically for the service. In some embodiments, the automatic image analysis and adjustment service includes programming interfaces such as IEnumFilters and IImageAutoProcess. Details for the IEnumFilters and IImageAutoProcess APIs are provided below:

```
//
// IEnumFilters interface declarations
//
DECLARE_INTERFACE_(IEnumFilters, IUnknown)
{
    STDMETHOD(Init)(DWORD dwFlags);
    STDMETHOD(Next)(ULONG cFilters, IImageFitter **ppFilter,
ULONG *pcFeteched);
    STDMETHOD(Skip)(ULONG cFilters);
    STDMETHOD(Reset)(void);
    STDMETHOD(Clone)(IEnumFilters **ppEnum);
};
//
// IImageAutoProcess interface declarations
//
DECLARE_INTERFACE_(IImageAutoProcess, IUnknown)
{
    STDMETHOD(Initialize)(TCHAR *tcsFilename, DWORD dwFlags);
    STDMETHOD(Initialize)(IStream *pStream, DWORD dwFlags);
```

-continued

```
    STDMETHOD(Initialize)(BYTE *pBuffer, DWORD dwFlags);
    STDMETHOD(EnumFilters)(IEnumFilters **ppEnum);
    STDMETHOD(Process)(void);
    STDMETHOD(Finalize)(void);
};
```

Alternatively, the automatic image analysis and adjustment service can use other custom or pre-existing interfaces for performing image analysis and adjustment.

Figure 7:
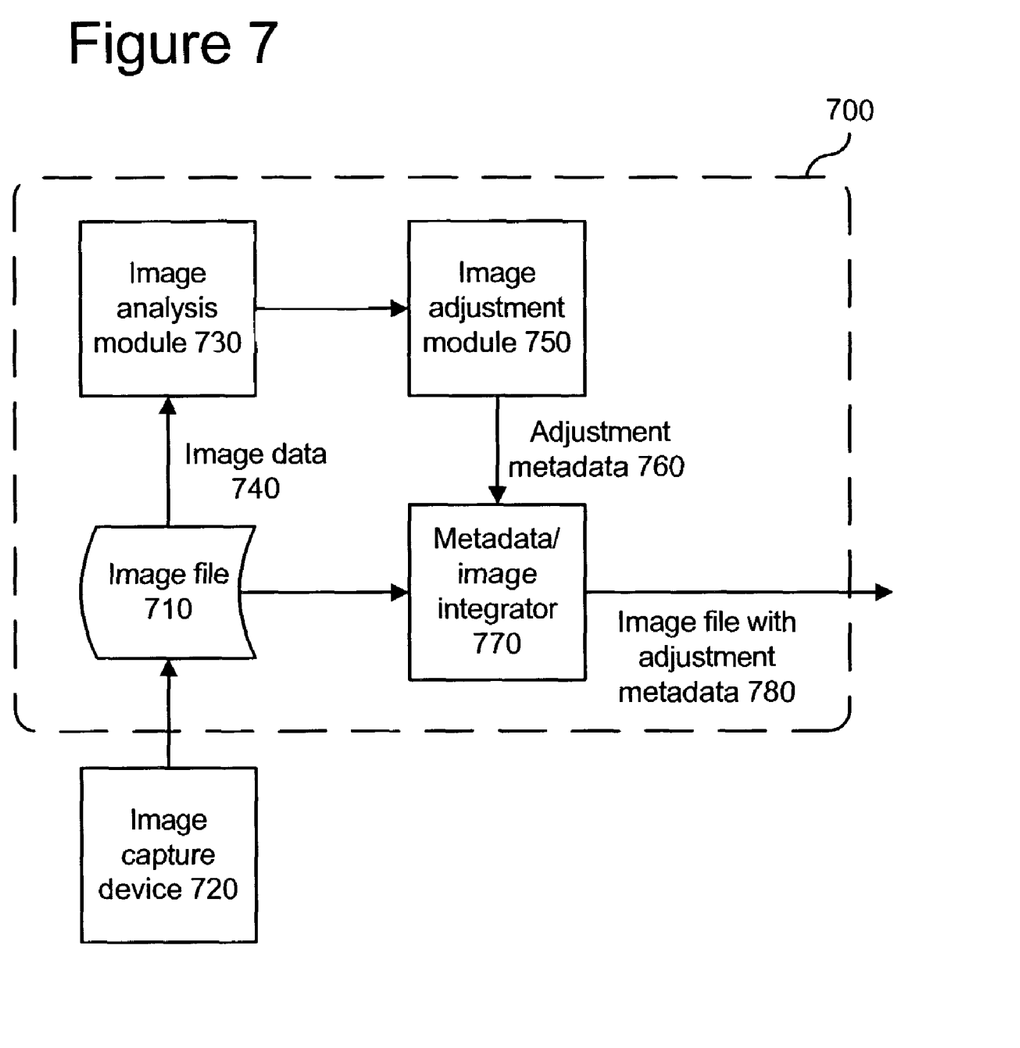
FIG. 7 is a block diagram of an automatic image analysis and adjustment tool that interacts with an image capture device.

FIG. 7 shows an example of an automatic image analysis and adjustment service 700 used in some embodiments. The automatic image analysis and adjustment service 700 receives image files (e.g., image file 710) transferred from source locations such as image capture device 720. Image analysis module 730 analyzes image data 740 from image file 710. Image analysis module 730 analyzes the image data 740 to identify ways in which the image can be adjusted to improve the quality of the image. For example, image analysis module 730 can perform red-eye detection, blur detection, orientation analysis, noise detection, color balance analysis, exposure analysis, and/or other types of image analysis. Image adjustment module 750 then adjusts the image data, if necessary, based on the analysis, and generates adjustment metadata 760. Metadata/image integrator 770 integrates the adjustment metadata 760 and outputs image file with adjustment metadata 780.

Figure 8:
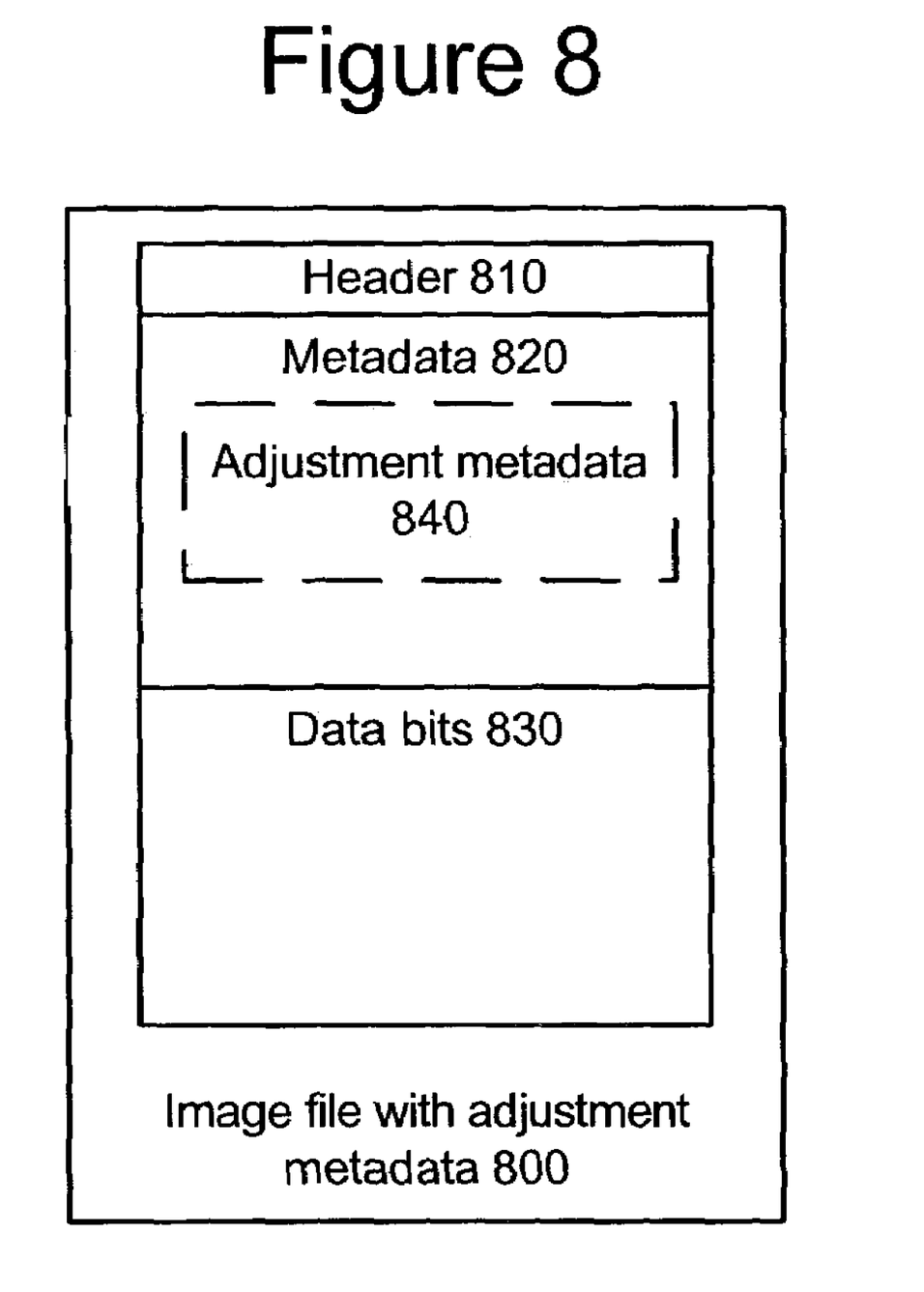
FIG. 8 is a block diagram of an image file with adjustment metadata.

For example, referring to FIG. 8, an image file 800 includes a header 810, metadata section 820, and data bits section 830. Adjustment metadata 840 is stored in the metadata section 820. Alternatively, data within the image file 800 can be arranged in other ways.

Referring again to FIG. 7, in some embodiments, metadata/image integrator 770 adds the generated metadata to image file 710. Alternatively, metadata/image integrator 770 adds the generated metadata to another file (e.g., a copy or another version of image file 710).

Figure 9:
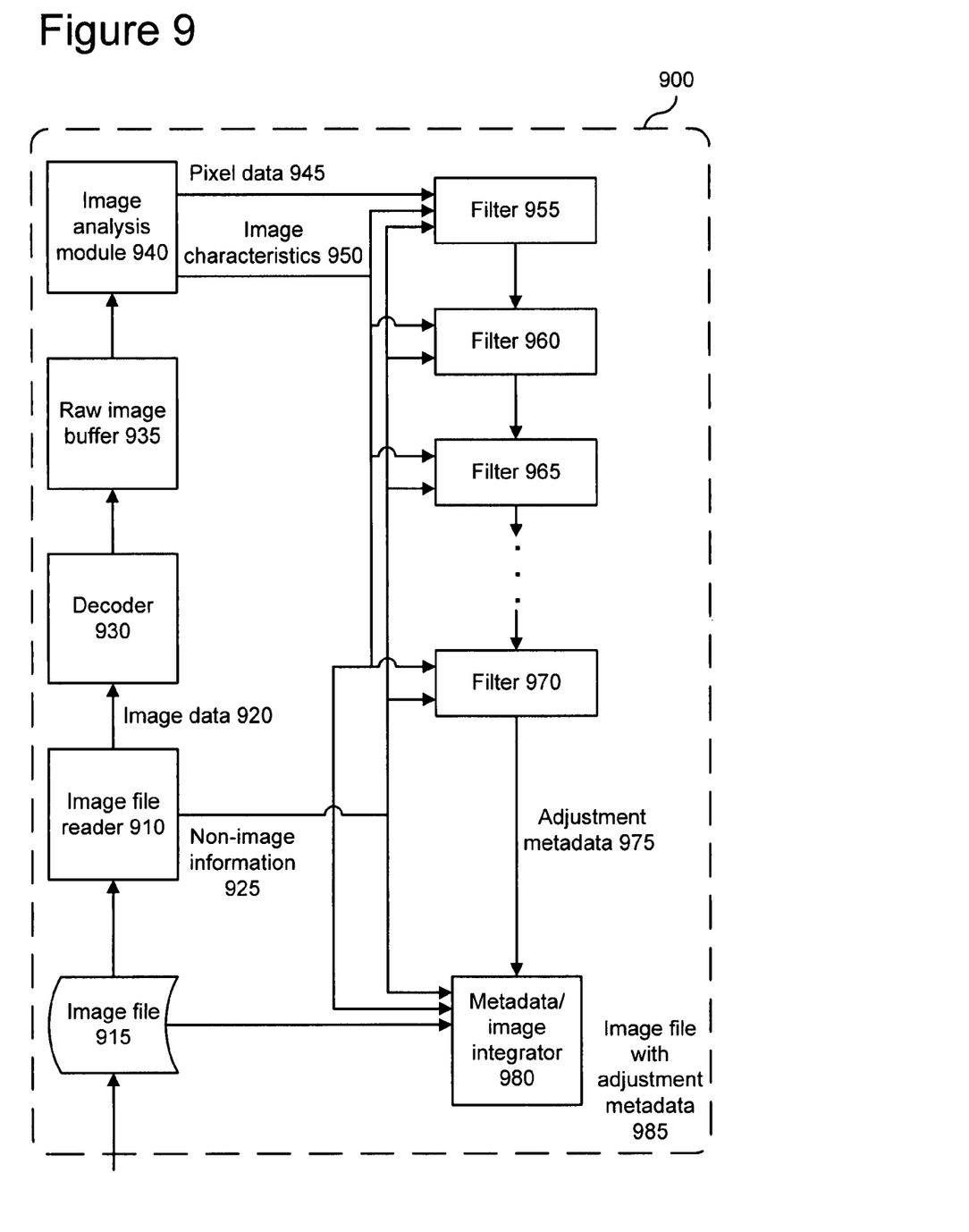
FIG. 9 is a detailed block diagram of an automatic image analysis and adjustment tool that provides image files with adjustment metadata to a user mode application.

FIG. 9 shows another example of an automatic image analysis and adjustment service 900 used in some embodiments. An image file reader 910 in the automatic image analysis and adjustment service 900 reads image files (e.g., image file 915) received from source locations such as an image capture device (not shown). Image file reader 910 can be any entity capable of reading an image file. For example, for image files in JPEG format, the image reader may be a JPEG image file reader. Image file reader 910 can also be an image file reader capable of reading image files in other formats, such as EXIF, BMP, TIFF, PNB, GIF, WMF and/or EMF formats. Automatic image analysis and adjustment service 900 can incorporate a single image file reader capable of reading one or more file formats, or multiple image file readers.

From image file reader 910 comes image data 920 and non-image information 925. Non-image information can include data indicating, for example, whether a flash was used in a photograph, focal length, shutter speed, camera model, aperture setting, date, etc. Non-image information can be used in several ways. For example, the automatic image analysis and adjustment service 900 may use an indicator of whether a flash was used in a digital image to determine whether to check for red-eye when analyzing the image, or whether to use a particular filter to remove red-eye from an image.

Image data 920 goes to decoder 930 for decoding. Because image analysis is typically done in the raw image data space, decoder 930 can be used to decode the image data 920 into raw image buffer 935. Decoder 930 can be any entity capable of decoding a compressed image. For example, to provide capability for decoding image files in JPEG format, decoder 930 can be a JPEG decoder. Automatic image analysis and adjustment service 900 can incorporate a single decoder capable of reading one or more file formats, or multiple decoders. If no image decoding is needed, the decoder can be bypassed or omitted.

Raw image buffer 935 receives decoded raw image data. Image analysis module 940 analyzes the decoded raw image data (e.g., by performing red-eye detection, blur detection, orientation analysis, noise detection, color balance analysis, exposure analysis, and/or other types of image analysis). Image analysis module 940 then sends pixel data 945 and image characteristics (i.e., image analysis results) 950 to other components of automatic image analysis and adjustment service 900.

Automatic image analysis and adjustment service includes one or more filters for adjusting image data. These processing filters cascade together to perform image adjustment processing on pixel data for an image based on the image analysis results. For example, automatic image analysis and adjustment service 900 includes filters 955, 960, 965 and 970 for adjusting image data based on analysis of the image data. The automatic image analysis and adjustment service uses filters to adjust image data to compensate for red-eye, blurriness, incorrect orientation, noise, incorrect color balance, incorrect exposure, and/or other types of image problems. While some embodiments include several filters, the filters need not all be used when analyzing and adjusting images. Filters can be enabled or disabled (either automatically or by user interaction) in order to process images in different ways. For example, when analyzing/adjusting a digital photograph where no flash was used, a user can disable (or the service can automatically disable) the red-eye filter.

The filters generate adjustment metadata 975 corresponding to adjustments of the pixel data. At the end of the processing chain, metadata/image integrator 980 updates and integrates metadata for the image into an output file 985 which contains the adjusted pixel data. In some embodiments, metadata/image integrator 980 adds the generated metadata to image file 915. Alternatively, metadata/image integrator 980 adds the generated metadata to another file (e.g., a copy of or additional version of the image file 915). The automatic image analysis and adjustment service can also include an encoder (not shown) to re-encode images that have been previously decoded.

While automatic image analysis and adjustment service filters can be chained together, the filters are operable as individual processing units. Each filter performs a specific processing function. The modularity of the filters allows new filters to be added and allows existing filters to be chained together in different arrangements, omitted, or replaced with different filters. This architecture facilitates extensibility and flexibility, allowing third parties, such as independent hardware vendors (IHVs) or independent software vendors (ISVs), to provide additional and/or improved digital image adjustment functionality to the service. New filters (e.g., filters provided by IHVs or ISVs) can be authenticated and/or approved before installation into the service.

In some embodiments, the automatic image analysis and adjustment service uses the following flags to define the scope of image analysis/adjustment filters to enumerate:

```
enum ImageFilterSwitches
{
    IMAGE_FILTER_SWITCH_ALL
    IMAGE_FILTER_SWITCH_AUTHENTICATED
    IMAGE_FILTER_SWITCH_USER_SELECT
    IMAGE_FILTER_SWITCH_INBOX
    IMAGE_FILTER_SWITCH_VENDOR
};  // Flags used to define the scope of filters to enumerate
```

Alternatively, the service uses different flags or other ways of defining the scope of filters to enumerate.

A. EXAMPLE

Correcting the Orientation of an EXIF Image

Suppose the automatic image analysis and adjustment processing chain comprises auto-orientation: automatically detecting image orientation and rotating it to the correct direction. The image analysis module 940 will first analyze the image textures and color distribution of the image contained in input EXIF image file to decide on the correct orientation for the image. Then, one or more filters process the image to rotate it, if necessary, to the correct orientation. Finally, the EXIF tag for the orientation of the image is created or updated to reflect that the image has been rotated to the correct orientation. For more information on the EXIF file format and EXIF tags, see JEITA CP-3451, *Exchangeable Image File Format for Digital Still Cameras: Exif Version* 2.2 (April 2002).

B. Implementation as Operating System Features

The tools and techniques described above can be implemented as operating system features. With an operating system that includes one or more of the described tools and techniques, users can take advantage of automatic image analysis and adjustment without using additional applications.

Some embodiments operate in a managed code environment. For example, automatic image analysis and adjustment tools and techniques are implemented within a managed-code operating system, but outside an image acquisition service, to facilitate modifications or updates to the tools.

Automatic image analysis and adjustment tools and techniques also can be implemented in a background service of an operating system.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method performed by a target computer of automatically processing digital images, the method comprising:

passing a request to acquire a digital image file from an automatic image analysis and adjustment service in the target computer to an external interface coupled to an image capture device, wherein the image capture device is selected from the group consisting of: a digital camera, a scanner, and a digital video camera;

acquiring the digital image file from the image capture device to the target computer that is separate from and connected to the image capture device by a connection selected from the group consisting of a wired connection and a wireless connection, the target computer having an application programming interface that facilitates transfer of digital image files from digital image data source devices to the target computer, the application programming interface comprising a member function configured to retrieve the digital image file from the image capture device;

at the target computer that is separate from and connected to the image capture device, analyzing image data from the digital image file; and at the target computer that is separate from and connected to the image capture device, adjusting the image data from the digital image file based at least in part on the analysis of the image data;

wherein the analyzing and the adjusting are performed automatically at the target computer that is separate from and connected to the image capture device, and wherein the analyzing and the adjusting are initiated by the acquiring of the digital image file from the image capture device to the target computer without further input from the user; and wherein the image capture device comprises an image capture device housing, and wherein the target computer comprises a computer housing that is separate from the image capture device housing.

2. The method of claim 1 wherein the acquiring is initiated at the image capture device.

3. The method of claim 1 wherein the acquiring is initiated at the target computer.

4. The method of claim 1 wherein the acquiring is performed via wireless communication.

5. The method of claim 1 wherein the acquiring is performed via a network connection.

6. The method of claim 1 further comprising analyzing non-image information from the digital image file;

wherein the adjusting is based at least in part on the analysis of the non-image information.

7. The method of claim 6 wherein the non-image information comprises one or more of the following: flash information, focal length, shutter speed, camera model information, aperture setting, date/time information.

8. The method of claim 1 wherein the image data comprises pixel data for the image.

9. The method of claim 1 further comprising generating image characteristic data prior to adjusting the image data;

wherein the adjusting is based at least in part on the image characteristic data.

10. The method of claim 9 wherein the image characteristic data comprises image orientation data, and wherein the adjusting comprises adjusting orientation of the image based on the image orientation data.

11. The method of claim 9 wherein the image characteristic data comprises one or more of the following: image orientation data, red-eye detection data, blur data, color balance data, exposure data, noise data.

12. The method of claim 1 further comprising:

generating metadata corresponding to the adjusting; and storing the metadata corresponding to the adjusting in the digital image file;

wherein the storing facilitates preservation of an original version of the digital image.

13. The method of claim 12 wherein the acquiring is performed in response to a request from a user-mode application, and further comprising:

providing the digital image file with the metadata to the user-mode application.

14. The method of claim 1 wherein automatic performance of the analyzing and the adjusting is selectively enabled or disabled by a user.

15. The method of claim 1 wherein the digital image file is a compressed digital image file.

16. The method of claim 1 wherein the digital image file is in an EXIF format.

17. The method of claim 1 wherein the acts are performed in an operating system environment as a feature of the operating system environment.

18. The method of claim 17 wherein the operating system environment is a managed code environment.

19. The method of claim 1 wherein the analyzing and the adjusting are performed in a background service of an operating system environment.

20. The method of claim 1 further comprising:

storing the adjusted image data on a storage device at the target computer.

21. A method performed by a target computer of automatically processing digital images the method comprising:

passing a request to acquire a first digital image file from an automatic image analysis and adjustment service in the target computer to an external interface coupled to an image capture device, wherein the image capture device is selected from the group consisting of: a digital camera, a scanner, and a digital video camera, and wherein the target computer is separate from and connected to the image capture device by a connection selected from the group consisting of a wired connection and a wireless connection;

responsive to the request, acquiring a first digital image file from the image capture device to the target computer that is separate from and connected to the image capture device;

responsive to the acquisition of the first digital image file from the image capture device to the target computer which is separate from and connected to the image capture device, analyzing image data from the first digital image file at the target computer;

initiated by the acquisition of the first digital image file from the image capture device to the target computer which is separate from and connected to the image capture device, and prior to receiving any user input relating to the analyzing, adjusting the image data from the first digital image file at the target computer based at least in part on the analysis of the image data; and wherein the target computer has an application programming interface that allows transfer of digital image files from multiple different types of digital image data source devices to the target computer, the application programming interface comprising a member function configured to retrieve the first digital image file from the image capture device; and wherein the image capture device comprises an image capture device housing, and wherein the target computer comprises a computer housing that is separate from the image capture device housing.

22. A computer system comprising:

an external communication connection device at a target computer selected from the group consisting of a wired communication connection device and a wireless communication connection device;

an image acquisition application programming interface at the target computer for acquiring one or more digital image files containing one or more digital images from a digital image capture device coupled to the external communication connection device, wherein the digital image capture device is separate from and connected to the target computer, and is selected from the group consisting of: a digital camera, a scanner, and a digital video camera;

a memory at the target computer for storing the one or more acquired digital image data files containing the one or more acquired digital images;

an image analysis software module at the target computer for analyzing the one or more acquired digital images at image acquisition time;

an image adjustment software module at the target computer for adjusting the one or more acquired digital images at image acquisition time, wherein the adjusting is based at least in part on the analyzing, wherein the analyzing and the adjusting are initiated by the acquiring of the one or more digital image files containing one or more digital images from the digital image capture device which is separate from and connected to the target computer and occur prior to further user input; and at least one processor at the target computer;

wherein the image analysis software module and the image adjustment software module are in an image acquisition service of an operating system of the target computer, and wherein the one or more digital image files are acquired by passing a request to acquire the one or more digital image files from the image acquisition service of the operating system of the target computer to the external communication connection device; and wherein the digital image capture device comprises a digital image capture device housing, and wherein the target computer comprises a computer housing that is separate from the digital image capture device housing.

23. The computer system of claim 22 further comprising an image output device for visually displaying digital images.

24. The computer system of claim 22 further comprising:
an image decoder for decoding compressed digital image data; and
an image encoder for encoding adjusted digital image data.

25. The computer system of claim 22 wherein the image adjustment software module comprises one or more processing filters for adjusting the one or more acquired digital images.

26. The computer system of claim 22 wherein the image adjustment software module comprises an extensible software architecture operable to allow customization of the image adjustment software module, wherein the extensible software architecture comprises one or more processing filters for adjusting the one or more acquired digital images, wherein each of the one or more processing filters encapsulates an image adjustment function.

27. The computer image acquisition system of claim 26 wherein the customization comprises adding, removing or reordering processing filters in the image adjustment software module.

28. One or more computer-readable storage media having stored thereon a software system for automatically processing digital images in a target computer, the software system comprising:

code for passing a request to acquire an image data file from an automatic image analysis and adjustment service in the target computer to an external interface coupled to an image capture device which is separate from and connected to the target computer, wherein the image capture device is selected from the group consisting of: a digital camera, a scanner, and a digital video camera;

code for receiving, responsive to the request, a digital image file comprising a digital image from the image capture device that is separate from and connected to the target computer via a connection selected from the group consisting of a wired connection and a wireless connection, the receiving facilitated by an application programming interface that facilitates transfer of digital image files from digital image capture devices to the target computer, the application programming interface comprising a member function configured to retrieve the digital image file from the image capture device;

code for analyzing digital image data in the received digital image file, wherein the code for analyzing automatically analyzes the digital image data responsive to the received digital image file and without further user input; and code for adjusting the digital image based on the automatic analysis of the digital image data, wherein the code for adjusting automatically adjusts the digital image data responsive to the automatic analysis without further user input;

wherein the image capture device comprises an image capture device housing, and wherein the target computer comprises a computer housing that is separate from the image capture device housing.

29. The software system of claim 28 wherein transfer of the digital image file from the image capture device to the target computer is initiated by device event data originating at the image capture device.

30. The software system of claim 28 wherein transfer of the digital image file from the image capture device to the target computer is initiated by a request originating at the target computer.

31. The software system of claim 28 wherein the digital image file is received via wireless communication.

32. The software system of claim 28 wherein the wired connection is a network connection.

33. The software system of claim 28 wherein the code for analyzing further comprises code for analyzing non-image information from the received digital image file.

34. The software system of claim 33 wherein the non-image information comprises one or more of the following: flash information, focal length, shutter speed, camera model information, aperture setting, date/time information.

35. The software system of claim 28 wherein the image data comprises pixel data for the image.

36. The software system of claim 28 further comprising code for generating image characteristic data prior to adjusting the image data.

37. The software system of claim 36 wherein the image characteristic data comprises one or more of the following:

image orientation data, red-eye detection data, blur data, color balance data, exposure data, noise data.

38. The software system of claim 28 further comprising code for selectively enabling or disabling the code for adjusting.

39. The software system of claim 28 wherein the software system is implemented as a feature of an operating system environment.

40. The software system of claim 39 wherein the operating system environment is a managed code environment.

41. One or more computer-readable storage media having stored thereon a software system providing automatic digital image processing functionality at a target computer, the software system comprising:

a customizable software architecture for adjusting digital image data at a target computer based on analysis performed at the target computer, wherein the adjusting and the analysis of the digital image data is responsive, without further user input, to acquisition of one or more files containing digital images by the target computer from an image capture device which is separate from and connected to the target computer by a connection selected from the group consisting of a wired connection and a wireless connection, wherein the customizable software architecture is capable of operably coupling one or more image adjustment modules encapsulating image adjustment functions to one or more image analysis modules;

wherein the functionality of the software system is capable of being customized by altering an arrangement of image adjustment modules operably coupled to the one or more image analysis modules;

wherein the acquisition is responsive to passing a request to acquire an image data file from the customizable software architecture for adjusting digital image data in the target computer to an external interface coupled to the image capture device, wherein the image capture device is selected from the group consisting of: a digital camera, a scanner, and a digital video camera;

wherein the target computer has an application programming interface that facilitates transfer of digital image files from the image capture device to the target computer, the application programming interface comprising a member function configured to retrieve a digital image file from the image capture device; and wherein the image capture device comprises an image capture device housing, and wherein the target computer comprises a computer housing that is separate from the image capture device housing.

42. The software system of claim 41 wherein the altering comprises adding image adjustment modules encapsulating image adjustment functions to the software system.

43. The software system of claim 41 wherein the altering comprises changing the functional order of image adjustment modules operably coupled to one another in the software system.

44. A computer-readable storage medium having computer-executable code for the software system of claim 41.

45. A computer-readable storage medium having instructions encoded thereon which, when executed on a target computer, cause the target computer to perform a method of automatically processing digital images, the method comprising:

passing a request to acquire a digital image file from an automatic image analysis and adjustment service in the target computer to an external interface coupled to an image capture device, wherein the image capture device is selected from the group consisting of: a digital camera, a scanner, and a digital video camera;

acquiring the digital image file from the image capture device to the target computer that is separate from and connected to the image capture device by a connection selected from the group consisting of a wired connection and a wireless connection, the target computer having an application programming interface that facilitates transfer of digital image files from digital image data source devices to the target computer, the application programming interface comprising a member function configured to retrieve the digital image file from the image capture device;

at the target computer that is separate from and connected to the image capture device, analyzing image data from the digital image file; and at the target computer that is separate from and connected to the image capture device, adjusting the image data from the digital image file based at least in part on the analysis of the image data;

wherein the analyzing and the adjusting are performed automatically at the target computer that is separate from and connected to the image capture device, and wherein the analyzing and the adjusting are initiated by the acquiring of the digital image file from the image capture device to the target computer without further input from the user; and wherein the image capture device comprises an image capture device housing, and wherein the target computer comprises a computer housing that is separate from the image capture device housing.

* * * * *